(12) United States Patent
Takahashi et al.

(10) Patent No.: US 7,803,452 B2
(45) Date of Patent: Sep. 28, 2010

(54) RELEASE FILM

(75) Inventors: Ryo Takahashi, Saitama (JP); Tomomi Fukaya, Saitama (JP); Toshio Sugizaki, Kanagawa (JP)

(73) Assignee: Lintec Corporation (JP)

( * ) Notice: Subject to any disclaimer, the term of this patent is extended or adjusted under 35 U.S.C. 154(b) by 446 days.

(21) Appl. No.: 11/394,308

(22) Filed: Mar. 30, 2006

(65) Prior Publication Data

US 2006/0222814 A1 Oct. 5, 2006

(30) Foreign Application Priority Data

Mar. 31, 2005 (JP) .............................. 2005-103841

(51) Int. Cl.
B32B 27/00 (2006.01)
(52) U.S. Cl. ....................... 428/212; 428/213; 428/141; 428/336; 428/480
(58) Field of Classification Search ................. 428/212, 428/213, 141, 336, 480
See application file for complete search history.

(56) References Cited

U.S. PATENT DOCUMENTS

| | | | | |
|---|---|---|---|---|
| 4,943,555 | A * | 7/1990 | Nakamoto et al. | 503/227 |
| 5,093,309 | A * | 3/1992 | Hart et al. | 503/227 |
| 5,631,062 | A * | 5/1997 | Masuyama et al. | 428/141 |
| 5,935,903 | A * | 8/1999 | Goss et al. | 503/227 |
| 6,582,789 | B1 * | 6/2003 | Sumi | 428/40.1 |

FOREIGN PATENT DOCUMENTS

| JP | 10-229027 A | 8/1998 |
|---|---|---|
| JP | 11-320764 A | 11/1999 |
| JP | 2000-158611 | 6/2000 |
| JP | 2002-331614 A | 11/2002 |
| JP | 2003-191384 A | 7/2003 |
| JP | 2004-195825 A | 7/2004 |
| JP | 2005-047175 A | 2/2005 |
| JP | 2005-047177 A | 2/2005 |
| JP | 2006-007550 A | 1/2006 |
| WO | WO 2006/001151 A1 | 1/2006 |

OTHER PUBLICATIONS

Ono Ken, JP 2004-187119 machine translation.*
Masahiko, JP 08-337751 machine translation, Dec. 1996.*
Toshiya, JP 2000-117901 machine translation, Apr. 2000.*
Singapore Office Action dated Mar. 28, 2007.
British Patent Office Search Report, GB Pat. App. No. 0606273.1, Aug. 1, 2006.

* cited by examiner

*Primary Examiner*—David R Sample
*Assistant Examiner*—Lawrence D Ferguson
(74) *Attorney, Agent, or Firm*—Brinks Hofer Gilson & Lione; G. Peter Nichols

(57) ABSTRACT

A release film that can be used as a carrier film for a green sheet used in a laminated ceramic capacitor is provided. The release film includes a base material having both major surfaces, a releasing agent layer provided on one major surface of the base material, and an antistatic layer provided on the other major surface of the base material, wherein the releasing agent layer and the antistatic layer are mainly composed of the same material, and when the surface roughness of the outer surface of the releasing agent layer is defined as $Ra_1$ [nm] and the surface roughness of the outer surface of the antistatic layer is defined as $Ra_2$ [nm], the relations of $Ra_1 \leq 15$ and $Ra_1 \leq Ra_2$ are satisfied. The release film is capable of preventing occurrence of blocking when being wound in a rolled form for storage and generation of static electricity when being unwound.

8 Claims, 1 Drawing Sheet

RELEASE FILM

RELATED APPLICATIONS

This application claims priority under 35 U.S.C. §119 to Japanese Patent Application No. JP2005-103841 filed Mar. 31, 2005, the entire content of which is hereby incorporated by reference.

BACKGROUND OF THE INVENTION

1. Field of the Invention

The present invention relates to a release film, and more particularly relates to a release film that can be used as a carrier film for a green sheet used in a laminated ceramic capacitor.

2. Description of the Prior Art

A release film is used, for example, as a carrier film for a green sheet used in a laminated ceramic capacitor.

In recent years, ceramic layers in a multilayer type ceramic capacitor are becoming thinner and thinner. In such a case, if surface roughness of a releasing agent layer provided on a base material of a release film is high, there is a possibility that defect such as repellent of slurry or formation of pinholes may occur when coating a ceramic slurry onto the releasing agent layer of the release film.

To solve such a problem, a release film which is formed from a base material and a releasing agent layer having low surface roughness (namely, having high smoothness) provided on the base material may be used. However, such a release film may cause problems such as occurrence of blocking, formation of wrinkles, and the like when winding up a release film in a rolled form.

In view of such problems, there has been an attempt to prevent the occurrence of blocking and the like by setting surface roughness of a surface of a base material on which a releasing agent layer is not provided to a relatively high value (See JP-A No. 10-229027, for example).

However, in a case where such a release film as described in JP-A No. 10-22927 is used, static electricity is likely to be generated when unwinding the wound up release film. When such static electricity is generated, it becomes difficult for the wound up release film to be unwound. Further, foreign substances such as dirt or dust are likely to adhere to the release film, whereby causing defect such as repellent of slurry or formation of pinholes when coating a ceramic slurry onto the release film.

SUMMARY OF THE INVENTION

In view of the above problems, it is an object of the present invention to provide a release film capable of preventing occurrence of blocking when it is wound up in a rolled form for storage and also preventing generation of static electricity when the wound up release film is unwound.

In order to achieve the above object, the present invention is directed to a release film which comprises a base material having both major surfaces; a releasing agent layer provided on one major surface of the base material; and an antistatic layer provided on the other major surface of the base material, wherein the releasing agent layer and the antistatic layer are mainly composed of the same material, and when the surface roughness of the outer surface of the releasing agent layer is defined as $Ra_1$ [nm] and the surface roughness of the outer surface of the antistatic layer is defined as $Ra_2$ [nm], the relations of $Ra_1 \leqq 15$ and $Ra_1 \leqq Ra_2$ are satisfied.

According to the release film of the present invention, it is possible to prevent occurrence of blocking when the release film is wound in a rolled form for storage and also prevent generation of static electricity when the wound up release film is unwound.

In the release film according to the present invention, it is preferred that the surface roughness $Ra_2$ of the outer surface of the antistatic layer is in the range of 10 to 50 nm.

This makes it possible to prevent the occurrence of blocking between the releasing agent layer and the antistatic layer effectively and to maintain the smoothness of the outer surface of the releasing agent layer sufficiently when the release film is wound up in a rolled form for storage.

In the release film according to the present invention, it is also preferred that the average thickness of the antistatic layer is in the range of 0.01 to 0.3 μm.

This enables the antistatic layer to exhibit its antistatic function sufficiently, and to have surface roughness within the desired range so that the occurrence of blocking between the releasing agent layer and the antistatic layer can be prevented effectively.

In the release film according to the present invention, it is also preferred that the average thickness of the releasing agent layer is in the range of 0.01 to 0.3 μm.

This enables the release film to have sufficient releasability and also to prevent the occurrence of blocking between the releasing agent layer and the antistatic layer effectively.

In the release film according to the present invention, it is also preferred that the base material is mainly composed of a polyester resin.

Since dust and the like are unlikely to be generated both during manufacturing process and when in use when the base material is mainly composed of a polyester resin, whereby making it possible to effectively prevent defect such as pinholes from being produced in a ceramic slurry coating due to dust and the like.

In the release film according to the present invention, it is also preferred that the base material is formed from a laminated body having a plurality of layers, and one of the plurality of layers which is in contact with the antistatic layer contains a filler therein.

Such a filler makes it possible to enhance the adhesiveness between the base material and the antistatic layer. Further, the smoothness of the surface of the antistatic layer can be made to be relatively low, whereby making it possible to prevent the occurrence of blocking between the releasing agent layer and the antistatic layer effectively.

PREFERRED EMBODIMENTS

Figure 1:
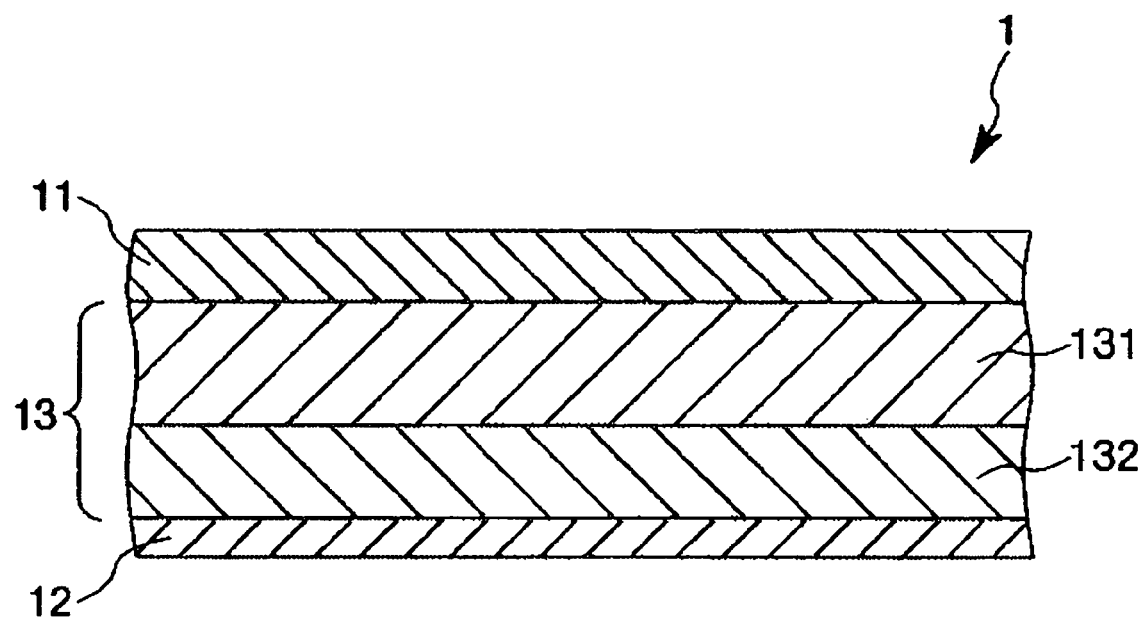
FIG. 1 is a cross-sectional view showing a release film of the present invention.

Hereinafter, a release film according to the present invention will be described in detail based on preferred embodiments.

FIG. 1 is a cross-sectional view showing a release film of the present invention. In the following description, the upper side in FIG. 1 denotes "top" or "upper side" and the lower side in FIG. 1 denotes "bottom" or "lower side".

A release film 1 includes a base material 13 having both major surfaces, a releasing agent layer 11 provided on one major surface of the base material 13, and an antistatic layer 12 provided on the other major surface of the base material 13.

The releasing agent layer 11 has a function of imparting releasability to the release film 1.

The releasing agent layer 11 is mainly composed of a releasing agent, and the outer surface thereof which does not face the base material has high smoothness. In particular, the surface roughness (that is, arithmetic mean deviation of the profile) Ra of the outer surface of the releasing agent layer 11 is 15 nm or less. By setting the surface roughness Ra of the outer surface of the releasing agent layer to be a value within such a range, if the release film 1 is used as a carrier film for a green sheet used in a laminated ceramic capacitor, it is possible to prevent repellent of slurry, formation of pinholes or the like at the time of coating a ceramic slurry onto the release film 1.

Examples of the releasing agent constituting the releasing agent layer 11 include silicone-based resins, long-chain alkyl-based resins, fluorine-based resins, a fluorosilicone resin and alkyd-based resins such as a long-chain alkyl-modified alkyd resin and a silicone-modified alkyd resin, and the like.

Among these resins, silicon-based resins are preferably used since a releasing agent layer 11 mainly composed of a silicone-based resin can exhibit greater releasability.

Examples of the silicon-based resins include silicon resins of addition type, condensation type, ultraviolet curing type, electron radiation curing type, and solventless type, and the like.

The average thickness of the releasing agent layer 11 is not particularly limited, but is preferably in the range of 0.01 to 0.3 μm, more preferably in the range of 0.05 to 0.2 μm. If the average thickness of the releasing agent layer 11 is less than the above lower limit value, there is a possibility that the releasing agent layer 11 cannot exhibit its function sufficiently depending on the kind of the constituent material thereof. On the other hand, if the average thickness of the releasing agent layer 11 exceeds the above upper limit value, there is a possibility that blocking may occur when the release film 1 is wound up in a rolled form, whereby causing a problem with unwinding the wound up release film 1.

The antistatic layer 12 has a function of preventing generation of static electricity when unwinding the wound up release film 1.

The antistatic layer 12 is mainly composed of a material that has substantially the same level of triboelectric series as that of the major component of the releasing agent layer 11.

In the prior art release film, there was a problem that static electricity is likely to be generated when unwinding the wound up release film. Thus generated static electricity makes it difficult for the wound up release film to be unwound when being used. Further, when such static electricity is generated, foreign substances such as dirt or dust are likely to adhere to the release film, whereby causing defect such as repellent of slurry or formation of pinholes when coating a ceramic slurry onto the release film. Further, there was also another problem that electrical discharge due to such static electricity may become a fire hazard when using a combustible material such as an organic solvent during the process of manufacturing a laminated ceramic capacitor.

However, since the release film 1 of the present invention is provided with the antistatic layer 12 which is made of the same kind of material as the major component of the releasing agent layer 11 and provided on the other major surface of the base material 13 on which the releasing agent layer 11 is not provided, generation of static electricity can be prevented when unwinding the wound up release film 1, thus making it possible to prevent the above mentioned various problems.

For example, in a case where the releasing agent layer 11 is mainly composed of a silicone-based resin, the antistatic layer 12 is also mainly composed of a silicone-based resin although they are not necessarily formed of exactly the same kind of silicon-based resin. On the other hand, in a case where the releasing agent layer 11 is mainly composed of a silicone modified alkyd resin, the antistatic layer 12 is also mainly composed of a silicone modified alkyd resin.

The outer surface of the antistatic layer 12 has reduced smoothness as compared with the outer surface of the releasing agent layer 11.

Namely, when the surface roughness Ra of the outer surface of the releasing agent layer 11 is defined as $Ra_2$ [nm] and the surface roughness Ra of the outer surface of the antistatic layer 12 is defined as $Ra_2$ [nm], the releasing agent layer 11 and the antistatic layer 12 satisfy the relation of $Ra_1<Ra_2$. This ensures that occurrence of blocking between the releasing agent layer 11 and the antistatic layer 12 can be prevented effectively when the release film 1 is wound up in a rolled form for storage.

Further, it is more preferred that the releasing agent layer 11 and the antistatic layer 12 satisfy the relation of $Ra_1<2\times Ra_2$. According to this, it is possible to prevent occurrence of blocking between the releasing agent layer 11 and the antistatic layer 12 more effectively.

In particular, the surface roughness $Ra_2$ of the outer surface of the antistatic layer 12 is preferably in the range of 10 to 15 nm, more preferably in the range of 15 to 30 nm. If the surface roughness $Ra_2$ is smaller than the above lower limit value, there is a possibility that it may become difficult to prevent occurrence of blocking between the releasing agent layer 11 and the antistatic layer 12 sufficiently depending on the constituent materials of the releasing agent layer 11 and the antistatic layer 12. On the other hand, if the surface roughness $Ra_2$ is larger than the above upper limit value, there is a possibility that the shape (that is, the fine roughness or irregularities) of the surface of the antistatic layer 12 may be transferred to the surface of the releasing agent layer 11 when winding up the release film 1 in a rolled form depending on the constituent materials of the releasing agent layer 11 and the antistatic layer 12, whereby making it difficult to maintain the smoothness of the outer surface of the releasing agent layer 11 sufficiently. Further, in a case where the surface roughness $Ra_2$ is larger than the above upper limit value, there is also a possibility that when a green sheet which has been formed by coating a slurry onto the releasing agent layer 11 is wound up in a rolled form, the shape (that is, the fine roughness or irregularities) of the surface of the antistatic layer 12 may be transferred to the surface of the green sheet, thus making it difficult to maintain the smoothness of the green sheet.

It is to be noted that the surface roughness $Ra_2$ of the outer surface of the antistatic layer 12 can be made to be within a desired range by adjusting the surface roughness Ra of the surface of the base material 13 on which the antistatic layer 12 is provided.

The average thickness of the antistatic layer 12 is not particularly limited, but is preferably in the range of 0.01 to 0.3 μm, more preferably in the range of 0.02 to 0.2 μm. If the average thickness of the antistatic layer 12 is less than the above lower limit value, there is a possibility that the antistatic layer 12 can not exhibit its function depending on the constituent material thereof. On the other hand, if the average thickness of the antistatic layer 12 exceeds the above upper limit value, the shape of the surface of the base material 13 which is in contact with the antistatic layer 12 is not reflected to the outer surface of the antistatic layer 12, thus making it difficult to set the surface roughness $Ra_2$ of the outer surface of the antistatic layer 12 to be within a desired range.

The base material 13 is made of polyester such as polyethylene terephthalate (PET) and polybutylene terephthalate (PBT), polyolefin such as polypropylene and polmethylpentene, plastic such as polycarbonate, and the like. Among these materials, PET is particularly preferable since dust and the like are unlikely to be generated both during manufacturing process and when in use when the base material 13 is made of PET, whereby making it possible to effectively prevent defect such as pinholes from being produced in a ceramic slurry coating due to dust and the like.

The base material 13 is formed from a laminated body including a first base material layer 131 and a second base material layer 132.

The first base material layer 131 is provided so as to be in contact with the releasing agent layer 11. The first base material layer 131 is mainly made of a resin material and has a function of supporting the releasing agent layer 11.

The surface of the first base material layer 131 which is in contact with the releasing agent layer 11 has high smoothness. In particular, the surface roughness Ra thereof is set to be 15 nm or less. In conformity with the smoothness of the surface of the first base material layer 131, the outer surface of the release layer 11 also has high smoothness.

Further, it is preferred that the surface roughness Ra of the surface of the first base material layer 131 which is in contact with the releasing agent layer 11 is 10 nm or less. According to this, the outer surface of the releasing agent layer 11 can be made to have further smoothness, whereby enhancing the effect of preventing the repellent of slurry or the formation of pinholes described above.

The average thickness of the first base material layer 131 is not particularly limited, but is preferably in the range of 1 to 30 μm, more preferably in the range of 2 to 20 μm.

The second base material layer 132 is provided so as to be in contact with the antistatic layer 12 and has a function of supporting the antistatic layer 12.

The second base material layer 132 is mainly made of a resin material and a filler.

In particular, it is preferred that the first base material layer 131 and the second base material layer 132 are composed of the same kind of resin material. This makes it possible to enhance adhesiveness between the first base material layer 131 and the second base material layer 132.

As mentioned above, the second base material layer 132 contains a filler. By containing such a filler, fine irregularities are formed on the surface of the second base material layer 132 which is in contact with the antistatic layer 12 so that the smoothness thereof is lowered. These fine irregularities are reflected to the outer surface of the antistatic layer 12, whereby also making the smoothness of the outer surface of the antistatic layer 12 relatively low. Further, since the fine irregularities are formed on the surface of the second base material layer 132 which is in contact with the antistatic layer 12, the adhesiveness between the second base material layer 132 and the antistatic layer 12 is enhanced due to anchor effect therebetween.

The surface roughness Ra of the surface of the second base material layer 132 which is in contact with the antistatic layer 12 is preferably in the range of 10 to 50 nm, more preferably in the rang of 15 to 30 nm. This enables the outer surface of the antistatic layer 12 to have a desired range of surface roughness Ra.

Examples of the filler contained in the second base material layer 132 include inorganic particles such as silica, calcium carbonate, kaolin, titanic oxide, aluminum oxide, barium sulfate and zeolite, and organic particles such as silicone resin, cross-linked polystyrene and acrylate resin. These materials can be used singly or in combination of two or more of them.

Further, it is also preferred that the average particle size of the filler is in the range of 0.1 to 4.0 μm. This makes it possible to form fine irregularities on the surface of the second base material layer 132 which is in contact with the antistatic layer 12.

Furthermore, it is also preferred that the amount of the filler contained in the second base material layer 132 is in the range of about 0.01 to 3.0 wt %. This allows the surface of the second base material layer 132 which is in contact with the antistatic layer 12 to have the surface roughness Ra within the desired range.

The average thickness of the second base material layer 132 is not particularly limited, but is preferably in the range of 5 to 125 μm, more preferably in the range of 10 to 100 μm.

The average thickness of the base material 13 in the form of the laminated body including the first base material layer 131 and the second base material layer 132 is not particularly limited, but is preferably in the range of 10 to 150 μm, more preferably in the range of 12 to 100 μm.

The release film 1 described above can be produced in the following manner.

First, the base material 13 in the form of the laminated body including the first base material layer 131 and the second base material layer 132 is prepared.

Such a base material 13 may be formed by any methods. Examples of the method of forming the base material 13 include a co-extrusion method in which a resin material for constituting the first base material layer 131 and a resin material containing a filler for constituting the second base material layer 132 are co-extruded to form the base material 13 and a method in which each of the first base material layer 131 and the second base material layer 132 is individually formed, and they are then bonded together with an adhesive.

Next, a releasing agent layer forming material containing a releasing agent is applied onto the upper surface of the first base material layer 131 of the base material 13 and is then dried to form the releasing agent layer 11.

On the other hand, an antistatic layer forming material is applied onto the lower surface of the second base material layer 132 and is then dried to form the antistatic layer 12.

The releasing agent layer forming material and the antistatic layer forming material can be obtained by dissolving or dispersing the respective constituent materials of the first base material layer and the second base material layer in any solvent or dispersion liquid.

Various methods can be used for coating the releasing agent layer forming material and the antistatic layer forming material onto the base material 13. Examples of such methods include gravure coating, bar coating, spray coating, spin coating, knife coating, roll coating, and die coating, and the like.

As described above, the release film 1 is produced.

Such a release film 1 can be used, for example, as a carrier film for a green sheet used in a laminated ceramic capacitor, or as a casting film used in the process of manufacturing a polarization plate for LCD or PDP.

Although the preferred embodiments of the release film according to the present invention have been described, the present invention is not limited thereto.

For example, in the above-mentioned embodiment, the base material is formed from the laminated body having two layers. However, the present invention is not limited thereto. The base material may be in the form of a single layer or a laminated body having three or more layers. In the case where a base material is formed from a single layer, the surface of the base material on which an antistatic layer is to be formed may be subjected to a rough surface treatment by any methods, and then, an antistatic layer may be formed thereon. Alternatively, a film made of a material for forming an antistatic layer may be formed on a base material, and then the outer surface of the film may be subjected to a rough surface treatment to form an antistatic layer.

Hereinafter, actual examples of a release film according to the present invention will be described.

(1) Production of Release Film

Example 1

First, a base material comprised of a first base material layer and a second base material layer both made of polyethylene terephthalate (PET) was formed by a co-extrusion method. The surface roughness Ra of the outer surface of the first base material layer was 5 nm and the thickness of the first base material layer was 6 μm. On the other hand, the surface roughness Ra of the outer surface of the second base material layer was 20 nm and the thickness of the second base material layer was 32 μm.

Further, 100 parts by weight of a silicone resin ("KS847H" manufactured by Shin-Etsu Chemical Co., Ltd.) and 1 part by weight of a curing agent ("CAT-PL50T" manufactured by Shin-Etsu Chemical Co., Ltd.) were diluted with toluene to thereby prepare a coating liquid having a solid concentration of 1 wt %.

Then, the thus obtained coating liquid was applied onto the upper surface of the first base material layer with a mayer bar #4, and was then dried by heating at a temperature of 140° C. for 60 seconds to form a releasing agent layer having an average thickness of 0.1 μm.

Further, the thus obtained coating liquid was applied onto the lower surface of the second base material layer with a mayer bar #4, and was then dried by heating at a temperature of 140° C. for 60 seconds to form an antistatic layer having an average thickness of 0.1 μm.

The release film was prepared as described above. In this regard, the surface roughness $Ra_1$ of the outer surface of the releasing agent layer was 6 nm while the surface roughness $Ra_2$ of the outer surface of the antistatic layer was 20 nm. Each of the surface roughness $Ra_1$ and $Ra_2$ was measured with a surface roughness measuring device ("SV3000S4" manufactured by Mitutoyo Corporation, stylus type: standard or round bar) under the following conditions;
  measuring length: 10 mm
  measuring rate: 1.0 mm/sec
  filter type: Gaussian
  λc: 0.25 mm.

The same measurement was repeatedly carried out 10 times and each of the surface roughness $Ra_1$ and $Ra_2$ was determined as an average value thereof.

Example 2

First, the same base material as that used in the Example 1 was prepared.

On the other hand, 100 parts by weight of a mixture of a silicone modified alkyd resin and an amino resin ("KS-882" manufactured by Shin-Etsu Chemical Co., Ltd.) and 1 part by weight of p-toluenesulfonic acid (curing agent) were diluted with toluene to thereby prepare a coating liquid having a solid concentration of 2 wt %.

Then, the thus obtained coating liquid was applied onto the upper surface of the first base material layer with a mayer bar #4, and was then dried by heating at a temperature of 140° C. for 60 seconds to form a releasing agent layer having an average thickness of 0.2 μm.

Further, the thus obtained coating liquid was applied onto the lower surface of the second base material layer with a mayer bar #4, and was then dried by heating at a temperature of 140° C. for 60 seconds to form an antistatic layer having an average thickness of 0.2 μm.

The release film was prepared as described above. In this regard, the surface roughness $Ra_1$ of the outer surface of the releasing agent layer was 5 nm while the surface roughness $Ra_2$ of the outer surface of the antistatic layer was 20 nm.

Example 3

A release film was produced in the same manner as in the Example 1 except that a base material was formed so that the surface roughness Ra of the outer surface of a first base material layer was 5 nm, the thickness of the first base material layer was 6 μm, the surface roughness Ra of the outer surface of a second base material layer was 15 nm, and the thickness of the second base material layer was 32 μm.

Example 4

A release film was produced in the same manner as in the Example 2 except that the same base material as that prepared in the Example 3 was used.

Comparative Example 1

A release film was produced in the same manner as in the Example 1 except that no antistatic layer was formed.

Comparative Example 2

A release film was produced in the same manner as in the Example 2 except that no antistatic layer was formed.

Comparative Example 3

A release film was produced in the same manner as in the Comparative Example 1 except that a base material was formed so that the surface roughness Ra of the outer surface of a first base material layer was 7 nm, the thickness of the first base material layer was 6 μm, the surface roughness Ra of the outer surface of a second base material layer was 8 nm, and the thickness of the second base material layer was 32 μm.

Comparative Example 4

A release film was produced in the same manner as in the Example 1 except that the same base material as that prepared in the Comparative Example 3 was used.

Comparative Example 5

A release film was produced in the same manner as in the Comparative Example 2 except that the same base material as that prepared in the Comparative Example 3 was used.

Comparative Example 6

A release film was produced in the same manner as in the Example 2 except that the same base material as that prepared in the Comparative Example 3 was used.

The surface roughness Ra of the outer surface of each of the first base material layer and the second base material layer of the base material and the surface roughness Ra of each of the releasing agent layer and the antistatic layer of the release film measured in each of the Examples and Comparative Examples will be shown in the following Table 1.

TABLE 1

| | Base Material | | | | | |
|---|---|---|---|---|---|---|
| | Surface Roughness of First Base Material Layer Ra [nm] | Surface Roughness of Second Base Material Layer Ra [nm] | Surface Roughness of Releasing Agent Layer $Ra_1$ [nm] | Surface Roughness of Antistatic Layer $Ra_2$ [nm] | Blocking Evaluation | Amount of Electrostatic Charge of Release Film [kV] |
| EX. 1 | 5 | 20 | 6 | 20 | No | 1 to 3 |
| EX. 2 | 5 | 20 | 5 | 20 | No | 1 to 3 |
| EX. 3 | 5 | 15 | 6 | 15 | No | 1 to 3 |
| EX. 4 | 5 | 15 | 5 | 15 | No | 1 to 3 |
| Com. Ex. 1 | 5 | 20 | 6 | | No | 5 to 10 |
| Com. Ex. 2 | 5 | 20 | 5 | | No | 5 to 10 |
| Com. Ex. 3 | 7 | 8 | 8 | | Yes | 5 to 10 |
| Com. Ex. 4 | 7 | 8 | 7 | 8 | Yes | 1 to 3 |
| Com. Ex. 5 | 7 | 8 | 7 | | Yes | 20 or more |
| Com. Ex. 6 | 7 | 8 | 7 | 8 | Yes | 5 to 10 |

(2) Evaluation

[Blocking Evaluation]

The release film which had been produced in each of the Examples and Comparative Examples was wound in a rolled form and stored for 30 days at a condition of 23° C. and 50% RH. Then, it was confirmed as to whether blocking had been occurring or not by visually observing the release film when being unwound.

[Amount of Electrostatic Charge of Release Film]

The release film which had been produced in each of the Examples and Comparative Examples was wound in a rolled form and stored for 30 days at a condition of 23° C. and 50% RH. Then, the amount of the electrostatic charge of the release film when being unwound with a slitter at 100 m/min was measured using a static electricity measuring device ("FMX-002" manufactured by The Simco Company, Inc.).

The results of this measurement are also shown in Table 1.

As shown in Table 1, the blocking was not observed in the release film of the Examples according to the present invention. In addition to this, the release film of the present invention could prevent generation of static electricity sufficiently when it was unwound. On the other hand, in each of the release films of the Comparative Examples 1 and 2, the amount of electrostatic charge was large although the blocking was not observed. Further, in each of the release films of the Comparative Examples 3 to 6, noticeable blocking was observed.

Finally, it is also to be understood that the present disclosure relates to the subject matter contained in Japanese Patent Application No. 2005-103841 (filed on Mar. 31, 2005) which is expressly incorporated herein by reference in its entirety.

What is claimed is:

1. A release film comprising:
   a base material having both major surfaces;
   a releasing agent layer provided on one major surface of the base material, the releasing agent layer having an outer surface having a surface roughness;
   an antistatic layer provided on the other major surface of the base material, the antistatic layer having an outer surface having a surface roughness; and
   a green sheet provided on the outer surface of the releasing agent layer;
   wherein the releasing agent layer and the antistatic layer are mainly composed of the same material, and the material constituting the releasing agent layer is a silicone-based resin, long-chain alkyl-based resin, fluorine-based resin or alkyd-based resin, wherein the surface roughness of the outer surface of the releasing agent layer is defined as $Ra_1$ [nm] and the surface roughness of the outer surface of the antistatic layer is defined as $Ra_2$ [nm], such that $Ra_1 \leqq 15$, $Ra_1 < 2Ra_2$, and $10 \leqq Ra_2 \leqq 50$ are satisfied.

2. The release film as claimed in claim 1, wherein the base material is mainly composed of a polyester resin.

3. The release film as claimed in claim 1, wherein the base material is formed from a laminated body having a plurality of layers, and one of the plurality of layers which is in contact with the antistatic layer contains a filler therein.

4. The release film as claimed in claim 1, wherein the base material is formed from a first base material layer and a second base material layer in contact with both the first base material layer and the antistatic layer, and the second base material layer contains a filler therein.

5. The release film as claimed in claim 4, wherein the first base material layer has a surface having a surface roughness in contact with the releasing agent layer and the second base material layer has a surface having a surface roughness in contact with the antistatic layer, and wherein the surface roughness of the surface of the first base material layer which is in contact with the releasing agent layer is 15 nm or less.

6. The release film as claimed in claim 5, wherein the surface roughness of the surface of the second base material layer which is in contact with the antistatic layer is in the range of 10 to 50 nm.

7. The release film as claimed in claim 1, wherein the average thickness of the antistatic layer is in the range of 0.01 to 0.3 μm.

8. The release film as claimed in claim 1, wherein the average thickness of the releasing agent layer is in the range of 0.01 to 0.3 μm.

* * * * *